3,415,891
STABILIZATION OF POLYOXYALKYLENE POLYOLS WITH ASCORBIC ACID TYPE STABILIZER

Takesi Turumaru, Takarazuka, Masaru Yotsuzuka, Nishinomiya, and Katsuhiko Ogino, Suita, Japan, assignors to Takeda Chemical Industries, Ltd., Osaka, Japan
No Drawing. Filed Feb. 7, 1964, Ser. No. 343,923
3 Claims. (Cl. 260—611.5)

ABSTRACT OF THE DISCLOSURE

A method is provided for the stabilization of polyoxyalkylene polyols which comprises admixing the polyoxyalkylene polyol with a stabilizer which is from the group consisting of ascorbic acid, isoascorbic acid and alkali metal and alkaline earth metal salts of said acid, alkanoic and alkenoic acid esters of the acid, as well as mixtures of said acids, salts and esters. The previously-mentioned stabilizers may be employed alone or in conjunction with known stabilizers as for example those of the phenol type. The invention also provides the stabilized polyoxyalkylene polyol compositions which compositions are useful as emulsifiers, synthetic lubricants, detergents, starting materials for the preparation of polyurethane plastics and the like.

---

This invention relates to a novel technic for stabilizing polyoxyalkylene polyol, and more particularly to the technic of stabilizing such polyol with the aid of ascorbic acid, isoascorbic acid, metal salts of these acids, aliphatic carboxylic acid esters of these acids or a mixture of the said acids, salts and/or esters, as stabilizer. The invention also relates to the thus-prepared stabilized polyoxyalkylene glycols.

The polyoxyalkylene polyols are well known high molecular compounds useful as emulsifiers, synthetic lubricants, detergents, starting materials for the preparation of polyurethane plastics, etc. Conventionally synthesized polyoxyalkylene polyol is readily subject to degradation or decomposition when exposed for any considerable length of time to air or to the action of ultraviolet rays, and this degradation or decomposition is enhanced at raised temperatures. When polyoxyalkylene polyol is heated in the air, it undergoes a remarkable decrease in weight, apparently due to the formation of degradation or decomposition products in the form of lower molecular compounds which are relatively volatile and evaporate readily into the air. Moreover, when polyoxyalkylene polyol is kept at room temperature in air for some time, e.g., ten to twenty days or longer, an aldehyde-like or dioxane-like odor is developed. Such degraded polyoxyalkylene polyol gives a positive reaction to fuchsinaldehyde reagent, whereas refined (undecomposed and not degraded) polyoxyalkylene polyol gives neither an aldehyde-like odor nor a positive reaction to fuchsin-aldehyde reagent. In addition to the described changes, the chemical breakdown resulting from degradation or decomposition of polyoxyalkylene polyol is also manifested by increase in acid value, decrease in viscosity, etc.

The aforesaid instability of polyoxyalkylene polyol has the result that the employment thereof is bound up with numerous inconveniences. For example, in the production of urethane foam, the use of deteriorated polyoxyalkylene polyol prevents a smooth reaction. Furthermore, urethane foam produced from deteriorated polyoxyalkylene polyol is of inferior quality.

In the circumstances, it is a desideratum in the art to provide means for preventing degradation or decomposition of polyoxyalkylene polyol and thereby to keep constant the chemical and physical properties of the polymer. The present invention is addressed to satisfying the said desideratum. Briefly stated, this has been accomplished by the incorporation into the polyoxyalkylene polyol of an effective quantity of stabilizer as precedingly defined (ascorbic acid, isoascorbic acid, metal salts of these acids, aliphatic carboxylic acid esters of these acids or a mixture of the said acids, salts and/or esters).

A primary object of the invention is to develop simple means for protecting polyoxyalkylene polyol against degradation or decomposition. A further object of the invention is to provide stabilized polyoxyalkylene polyol compositions which can be satisfactorily employed in all the known uses for polyoxyalkylene polyol.

As previously indicated, these objects are realized by the incorporation in the polyoxyalkylene glycol to be stabilized of an effective amount of ascorbic acid, isoasorbic acid, their metal salts, their aliphatic carboxylic acid esters or a mixture of more than one of these, hereinafter referred to as "stabilizer(s)."

More concretely, as the metal salts of ascorbic acid or isoascorbic acid, there are used alkali metal salts such as sodium salt, potassium salt, or alkaline earth metal salts such as calcium salt. The number of carbon atoms of the aliphatic carboxylic acid constituting said esters is preferably from 4 to 18, inclusive. The aliphatic carboxylic acid may be saturated or unsaturated. For example, the acid may be butyric acid, caproic acid, caprylic acid, capric acid, lauric acid, myristic acid, palmitic acid, stearic acid, linolic acid, linolenic acid, etc.

The expression "polyoxyalkylene polyol" in this specification refers to the reaction product of alkylene oxide and a compound having one or more reactive hydrogen atoms or its mono-, di- or poly-alkyl ethers. Suitable alkylene oxides are the lower alkylene oxides such as ethylene oxide, propylene oxide, butylene oxide, etc. Arylene oxides such as styrene oxide, etc., can also be used. The polyoxyalkylene polyols involved in this invention have a molecular weight within the range from about 350 to 8000, especially from about 750 to 4000, and also have hydroxyl number within the range from about 30 to 600; these apply also to the polyoxystyrene polyols. Illustrative of the compounds having one or more active hydrogen atoms are water, aliphatic mono-, di- or polyhydric alcohols, e.g., methyl alcohol, ethyl alcohol, propyl alcohol, butyl alcohol, hexyl alcohol, octyl alcohol, ethylene glycol, propylene glycol, diethylene glycol, dipropylene glycol, triethylene glycol, tripropylene glycol, glycerol, hexanetriol, pentaerythritol, sorbitol, trimethylol propane; aliphatic or aromatic mono-, di- or tri-amines, e.g., stearylamine, ethylenediamine, diethylenetriamine, hexamethylenediamine, phenylenediamine; aliphatic compounds having amino and hydroxyl groups, e.g., ethanolamines, propanolamines; aliphatic compounds having a mercapto group, e.g., dodecylmercaptan, 2,3-dimercapto-1-propanol; and aromatic compounds having one or more hydroxyl groups, e.g., 1,1,3-tris(p-hydroxyphenyl)propane, 1,1,2,2-tetrakis(p-hydroxyphenyl)propane, 4,4'-isopropylidenediphenol. Moreover, mixtures of polyoxyalkylene polyols may effectively be stabilized by the method of this invention.

The stabilizer of this invention may be employed together with known stabilizers, e.g., butyl-hydroxy-anisol, dibutyl-hydroxy-toluene, 2-α-alkylcycloalkyl-4,6-dimethylphenol, bis(2-hydroxy-3-α-alkylcycloalkyl-5-methylphenyl)methane, mono- or dialkyl biphenol, mono- or dialkyl cresol, methylene-bis(alkylphenol), mono- or dialkyl hydroquinone, hydroquinone, tris(alkylbenzyl)-phenol, mono- or dialkylphenol, etc. In such a case, effect on the stabilization of polyoxyalkylene polyol increases synergistically in general.

The quantity of the stabilizer of this invention, which can exhibit the objective stabilizing effect on the polymer is 0.01–1 percent by weight relative to polyoxyalkylene polyol to be stabilized, preferably 0.05–0.1 percent by weight in general. However, this value is not restrictive and any quantity of more than 1% of the stabilizer of this invention relative to polyoxyalkylene polyol may be employed in the method of the invention with satisfactory results. Generally, the use of less than 0.1% of the stabilizer of this invention is not effective in stabilizing polyoxyalkylene polyol. When the stabilizer of this invention is employed together with known stabilizer(s), the quantity of the stabilizer of this invention may be the same as that of the added known stabilizer(s), or more or less than that of the added known stabilizer(s). The total quantity of the stabilizer of this invention and the added known stabilizer(s) may preferably be 0.01–1% by weight relative to the polyoxyalkylene polyol. However, in general the ratio of the amount of the stabilizer of this invention relative to that of known stabilizers is most preferably 10–50:100, and the total quantity of the stabilizer of this invention and the added known stabilizer(s) is most preferably 0.05–0.1% by weight relative to the polyoxyalkylene polyol.

The addition of the stabilizer of this invention to the polyoxyalkylene polyol may conveniently be carried out in a variety of ways. The addition of the stabilizer of this invention may be made in the solid state, or as a solution in which the stabilizer of this invention is dissolved in a suitable solvent such as methyl alcohol, ethyl alcohol, benzene, etc. The addition may be carried out during or after the process of refining of polyoxyalkylene polyol, though in the former case care should be taken that the addition is carried out at least after the neutralization of alkaline catalyst employed for the polymerization. When the stabilizer of this invention is employed in a state of solution, the solvent may be removed under heating in an atmosphere of an inert gas, after mixing the stabilizer sufficiently with the polyoxyalkylene polyol. When the stabilizer is added to polyoxyalkylene polyol directly, i.e., in a solid form and not in solution in a solvent, the stabilizer of this invention is mixed thoroughly by heating in an atmosphere of an inert gas to dissolve the stabilizer of this invention uniformly in the polyoxyalkylene polyol. In a case of employing known stabilizer(s) together with the stabilizer of this invention or in a case of employing two or more kinds of the stabilizers of this invention, the addition of the stabilizer may be carried out simultaneously or separately.

Polyoxyalkylene polyol thus stabilized is very effectively protected against degradation or decomposition.

The following results show the effect on stabilizing polyoxyalkylene polyol [1]:

Stabilizer (1) Solution of 0.1 part by weight of ascorbic acid in 10 parts by volume of methanol.

[1] Polyoxypropylene, av. mol. wt.=2000.

(2) Solution of 0.1 part by weight of ascorbic acid caprylic acid ester in 10 parts by volume of methanol.

(3) Solution of 0.1 part by weight of dibutyl-hydroxy-toluene in 10 parts by volume of methanol.

(4) Solution of 0.06 part by weight of dibutyl-hydroxy-toluene and of 0.04 part by weight of ascorbic acid caprylic acid ester in 10 parts by volume of methanol.

(5) Solution of 0.04 part by weight of dibutyl-hydroxy-toluene and of 0.04 part by weight of ascorbic acid in 10 parts by volume of methanol.

(6) Solution of 0.1 part by weight of butyl-hydroxy-anisol in 10 parts by volume of methanol.

(7) Solution of 0.06 part by weight of butyl-hydroxy-anisol and of 0.04 part by weight of ascorbic acid in 10 parts by volume of methanol.

(8) Solution of 0.04 part by weight of butyl-hydroxy-anisol and of 0.06 part by weight of ascorbic acid calcium salt in 10 parts by volume of methanol.

Method of measurement 100 parts each by weight of polyoxypropylene glycol whose average molecular weight is 2000 is mixed well with stabilizer solution, followed by removal of the methanol in an atmosphere of nitrogen gas. Then, the compositions thus stabilized are kept at 120° C. with the aid of an infrared lamp. Decrease in the weight of the compositions are then measured. For purposes of comparison, the stability of polyoxyalkylene polyol is similarly observed without the addition of any stabilizer (control).

RESULT

| Stabilizer | Percent of decrease in the weight of +polyoxypropylene glycol composition | | | | |
|---|---|---|---|---|---|
| | 2 hrs. | 4 hrs. | 6 hrs. | 8 hrs. | 10 hrs. |
| (1) Ascorbic acid, 0.10% | 0.2 | 0.2 | 0.4 | 2.0 | |
| (2) Ascorbic acid caprylic acid ester, 0.10% | 0.2 | 0.4 | 1.5 | | |
| (3) Dibutyl-hydroxy-toluene, 0.1% | 0.2 | 0.6 | 3.0 | | |
| (4) Dibutyl-hydroxy-toluene, 0.06% + Ascorbic acid caprylic acid ester, 0.04% | 0.2 | 0.3 | 0.4 | 0.9 | 3.0 |
| (5) Dibutyl-hydroxy-toluene, 0.04% + Ascorbic acid, 0.04% | 0.2 | 0.3 | 0.5 | 0.8 | 2.5 |
| (6) Butyl-hydroxy-anisol, 0.1% | 0.2 | 0.3 | 0.4 | 0.6 | 1.8 |
| (7) Butyl-hydroxy-anisol, 0.06% + Ascorbic acid, 0.04% | 0.1 | 0.2 | 0.2 | 0.3 | 0.4 |
| (8) Butyl-hydroxy-anisol, 0.04% + Ascorbic acid calcium salt, 0.06% | 0.2 | 0.2 | 0.3 | 0.4 | 0.6 |
| Control | 2.0 | 4.7 | | | |

From the foregoing, it can be seen that the stabilizer of this invention has an excellent effect in the stabilization of polyoxyalkylene polyol. Especially, when the stabilizer of this invention is employed together with known stabilizer(s), the effect on stabilization increases synergistically.

The following examples represent presently preferred illustrative, non-limitative, embodiments of the invention. In the examples, all percentages are in weight percent, unless otherwise mentioned, and the relationship between part by weight and part by volume is the same as that between gram and milliliter.

EXAMPLE 1

To 100 parts of refined polyoxypropylene glycol whose average molecular weight is 2000 is added a solution of 5 parts by volume of methanol in which are dissolved 0.06 part of butyl-hydroxy-anisol and 0.04 part of ascorbic acid, to make the whole mixture homogeneous. Then methanol is removed in an atmosphere of nitrogen gas to obtain stabilized polyoxypropylene glycol composition.

EXAMPLE 2

To 100 parts of refined polyoxypropylene glycol whose average molecular weight is 2000 is added 0.1 part of ascorbic acid by a similar procedure as described in Example 1 to obtain stabilized polyoxypropylene glycol composition.

EXAMPLE 3

To 100 parts of refined polyoxypropylene glycol whose average molecular weight is 2000 are added 0.06 part of dibutyl-hydroxy-toluene and 0.04 part of ascorbic acid caprylic acid ester by a similar procedure as in Example 1 to obtain stabilized polyoxypropylene glycol composition.

EXAMPLE 4

To 100 parts of refined polyoxypropylene triol whose average molecular weight is 3000 is added 0.1 part of iso-ascorbic acid by a similar procedure as in Example 1 to obtain stabilized polyoxypropylene triol composition.

EXAMPLE 5

0.05 part of ascorbic acid calcium salt is dissolved in 100 parts of refined polyoxypropylene glycol (average molecular weight: 1000), from which no aldehyde is detected, with agitation under heating in an atmosphere of nitrogen gas to obtain stabilized polyoxypropylene glycol composition.

No aldehyde is detected from thus obtained composition even when tested with fuchsin-aldehyde reagent after the composition is kept at 60° C. for a week.

EXAMPLE 6

0.06 part of 2,4-dibutyl-hydroxy-toluene and 0.04 part of ascorbic acid are dissolved in 100 parts of refined polyoxypropylene hexanol (average molecular weight: 750, OH-number: 450, from which no aldehyde is detected, with agitation under heating at 60° C. in an atmosphere of nitrogen gas to obtain stabilized polyoxypropylene hexanol composition.

Having thus disclosed the invention, what is claimed is:

1. Stabilized polyoxypropylene glycol having an average molecular weight of about 2000 and containing in uniform admixture, as stabilizing additament, 0.06% by weight of butyl-hydroxy-anisol and 0.04% by weight of ascorbic acid.

2. Stabilized polyoxypropylene glycol having an average molecular weight of about 2000 and containing in uniform admixture, as stabilizing additament, 0.06% by weight of dibutyl-hydroxy-toluene and 0.04% by weight of ascorbic acid.

3. Stabilized polyoxypropylene hexanol having an average molecular weight of 750 and containing in uniform admixture, as stabilizing agent, 0.06% by weight of 2,4-dibutyl-hydroxy-toluene and 0.04% by weight of ascorbic acid.

References Cited

UNITED STATES PATENTS

| 2,440,383 | 4/1948 | Riemenschneider et al. | 252—407 |
| 2,679,459 | 5/1954 | Rosenwald | 260—611 |
| 2,927,932 | 3/1960 | Preston | 260—611 |
| 3,250,790 | 5/1966 | Klani | 252—407 |

FOREIGN PATENTS

| 255,957 | 11/1960 | Australia. |
| 869,096 | 5/1961 | Great Britain. |

LEON ZITVER, *Primary Examiner.*

H. T. MARS, *Assistant Examiner.*

U.S. Cl. X.R.

260—2.5, 77.5; 252—52, 56; 260—584, 609, 583, 578